United States Patent [19]

Gouarderes et al.

[11] Patent Number: 4,579,921
[45] Date of Patent: Apr. 1, 1986

[54] PROCESS FOR THE MANUFACTURE OF POLYACETYLENE

[75] Inventors: René Gouarderes, Idron; Gildas Merceur, Arthez de Bearn, both of France

[73] Assignee: Societe Nationale Elf Aquitaine, Courbevoie, France

[21] Appl. No.: 675,296

[22] Filed: Nov. 27, 1984

[30] Foreign Application Priority Data

Nov. 29, 1983 [FR] France ................................ 83 19023

[51] Int. Cl.$^4$ ............................................. C08F 38/02
[52] U.S. Cl. ..................................... 526/159; 526/169; 526/169.2; 526/285
[58] Field of Search ............ 526/136, 159, 169, 169.2, 526/285

[56] References Cited

U.S. PATENT DOCUMENTS

| | | | |
|---|---|---|---|
| 3,022,283 | 2/1962 | Wicklatz | 526/159 |
| 3,119,799 | 1/1964 | Natta | 526/159 |
| 3,299,016 | 1/1967 | Sonnenfeld | 526/159 |
| 4,277,588 | 7/1981 | Naarmann | 526/285 |
| 4,359,563 | 11/1982 | Naarmann | 526/285 |
| 4,384,090 | 5/1983 | Hocker | 526/169.2 |

Primary Examiner—Paul R. Michl
Attorney, Agent, or Firm—Burgess, Ryan & Wayne

[57] ABSTRACT

The invention is a process for polymerization of acetylene and of the derivatives thereof by a supported catalyst of the Ziegler type.

This catalyst is in suspension in a liquid medium the viscosity of which is between about 10 and 400 centipoises at room temperature.

The polyacetylene can be obtained in the form of film, gel, or powder that can be used for electrochemical or photovoltaic applications.

28 Claims, No Drawings

PROCESS FOR THE MANUFACTURE OF POLYACETYLENE

BACKGROUND OF THE INVENTION

The invention is directed to a process for the manufacture of polyacetylene in the form of a film, gel, or powder.

The synthesis of polyacetylene films is currently carried out by catalysts of the Ziegler type. The catalyst formed by combining a titanium compound with an aluminum organic compound is dissolved in an inert solvent. The polymerization of the gaseous acetylene takes place at the surface of the catalytic solution and there is obtained a polyacetylene film (Shirakawa—Japanese Pat. No. 73 32 581 of Oct. 6, 1973).

This process has a very low catalytic yield and the polyacetylene film must be washed many times to eliminate the catalyst residues.

It is known that Ziegler type catalysts deposited on a solid carrier, which are present in suspension in the polymerization medium, have a much higher catalytic yield. This process, which is called "supported catalysis" is extensively used for the polymerization of olefins. The "supported catalysis" has not been applied to the polymerization of acetylene. Since polyacetylene is infusible and insoluble in all solvents, the polyacetylene films are obtained directly by polymerization of gaseous acetylene on a flat surface formed by the interface of the gas with a non-stirred liquid. But without stirring, the solid particles impregnated with catalyst do not remain in the interface and fall to the bottom of the reactor.

BRIEF SUMMARY OF THE INVENTION

We have now found a process that makes it possible to overcome this objectionable feature inconvenience and to carry out the polymerization of acetylene and derivatives thereof by a catalyst on a solid carrier.

This process of polymerization comprises bringing into contact the acetylene or a gaseous acetylene derivative, at the polymerization temperature, with a liquid medium comprising a Ziegler-type catalyst containing an organic aluminum compound and at least one compound of a transition metal selected from Ti, V, Zr and Cr, characterized in that the liquid medium has a viscosity of from about 10 to 400 centipoises at room temperature, and the Ziegler-type catalyst is a supported catalyst present in suspension in the polymerization liquid medium.

The part played by said viscous medium is to maintain in suspension the catalyst particles in the absence of stirring so as to provide a sufficient concentration of catalyst at the gas-liquid interface to catalyze the polymerization of the acetylene.

Compared to a soluble catalyst, the productivity of the supported catalyst, used according to the invention, is multiplied by a factor on the order of about 250 under comparable operating conditions. By productivity of the catalyst is understood the amount of polymer, expressed in grams, produced by a gram of Ti of the catalyst. Because of the increased productivity, washing of the final product for elimination of catalytic residues is simplified and can even be omitted.

DETAILED DESCRIPTION OF THE INVENTION

The viscous medium is obtained by dissolving a thickener in an organic solvent used in Ziegler polymerizations. It is possible to use any thickeners soluble in the organic solvents that are inert in respect to the other constituents of the reaction medium.

Preferred thickeners are the polymeric compounds such as polystyrene or polyoxyethylene, but other polymers or co-polymers or mixtures thereof can provide the same advantages.

Where a polymeric thickener such as polystyrene or polyoxyethylene is used, the polyacetylene is formed with a polymeric matrix. The process of the present invention provides a polyacetylene having substantially improved mechanical properties, as indicated by the values obtained for elongation and tensile strength. In addition to increased interest in uses for the polyacetylene film, the improved mechanical properties provides a substantial advantage for the large-scale manufacture of the films.

The increased tensile strength of the polymer makes possible continuous removal of the film formed in the reactor and therefore provides a continuous manufacturing process.

On the other hand, the susceptibility for doping of the polyacetylene, and the electrical properties thereof, are not affected by the presence of the thickener.

The thickener is used in a concentration adequate for obtaining the desired viscosity of the liquid medium. The viscosity of the liquid medium is between about 10 and 400 centipoises, and preferably between about 30 and 100 centipoises, at room temperature. If polystyrene is used as the thickener, concentrations comprised between about 5 and 20%, and preferably between about 10 and 15%, make it possible to obtain viscosities within the above ranges.

Any organic solvent for said thickeners can be used provided it is inert in respect to the catalysts and the monomer. There are advantageously used aromatic solvents and particularly toluene, since it makes it possible to work in regions of desired temperature.

The process is useful for the polymerization of acetylene and of acetylene derivatives that are gaseous at the reaction temperature. Among the useful acetylene derivatives are the alkyl acetylenes such as methyl, ethyl, propyl, dimethyl and methyl-ethylacetylene, phenylacetylene and diacetylene.

The catalytic system of the Ziegler type useful in the present invention comprises an organic aluminum compound and at least one compound of a transition metal such as Ti, V, Zr and Cr deposited on a solid carrier.

The organic aluminum compounds are in general trialkyl aluminum and the preferred compounds are those in which the alkyl radical contains from 1 to 8 carbon atoms such as triethyl aluminum, tri-n-propyl aluminum, tri-isopropyl aluminum, tri-n-butyl aluminum, triisobutyl aluminum, and trioctylaluminium.

Among the transition metal compounds that are most commonly used are titanium derivatives such as alkyl titanates such as ethyl, n-propyl, isopropyl, n-butyl and isobutyl titanates or titanium halides such as titanium tetrachloride.

The molar ratio Al/transition metal and peferably Al/Ti can vary widely. It is generally between about 10 and 400, preferably between about 40 and 200.

The concentration of the catalyst is an important parameter in relation to the morphology of the polymer produced. By changing the concentration of the transition metal, it is possible to produce a film, a more or less viscous gel or a powder.

If the titanium concentration expressed in mmol/l of solvent is more than about 3 mmol/l, a polyacetylene film is formed on the surface of the viscous medium. By reducing the amount of titanium below about 3 mmol/l a polyacetylene in the form of a more or less viscous gel is obtained. Finally, if the concentration of titanium is about 0.1 mmol/l, polyacetylene in the form of a powder is produced.

The gel produced by the process of the present invention is supple and solid, which facilitates the stretching in the case of continuous manufacture. After evaporation of the solvent, the gel is transformed to a film or to a molded article according to the thickness of the layer of gel formed.

The polyacetylene powder formed in the presence of polymeric thickeners can be compacted to form molded articles.

If the solution containing the catalyst is subjected to substantial stirring, polyacetylene powder is obtained even at concentrations of transition metal of more than 0.1 mmol/l.

The solid carrier of the catalyst comprises an inorganic product such as $MgCl_2$, magnesia, alumina or silica, or an organic product such as a polymer insoluble in the reaction medium.

The temperature of the polymerization can vary over a broad range. The polymerization at a low temperature in the range of about $-78°$ C. provides a product comprising about 100% cis isomer and the polymerization at about $+150°$ C. provides a product comprising about 100% trans isomer. In the region of temperature between the two values, there is obtained a mixture of the cis and trans forms.

The cis form is more interesting, since the polymer is supple and the conductivity obtained after doping is better.

The thermodynamically more stable trans form is quickly obtained from the cis form by heating, for instance, at about 150° C., for two hours, or more slowly at about room temperature. During doping, the cis polyacetylene is transformed to the trans isomer.

For certain uses, specially in the photovoltaic field, the conductivity of the trans form is sufficient.

The polymerization can be conducted over a broad pressure range and preferrably at pressures between about a few millibars and about 2 absolute bars. The pressure is limited by the explosive threshold of the acetylene being polymerized.

The thickness of the film or the gel produced at a particular concentration of catalyst is a function of the pressure of the acetylene and the duration of the polymerization.

The polymerization can be carried out continuously or discontinuously.

In the process, the previously dried solvent is introduced into the reactor under an inert atmosphere. The thickener is dissolved in the solvent and then the compound of the transition metal on a solid carrier is added to the viscous medium. The organic aluminum compound is then introduced into the medium and the medium subjected to stirring and degasification. A suspension of the catalyst in the viscous medium is thus made. It is also possible to introduce the previously formed catalyst into the reactor. The reactor is brought to the selected temperature and the stirring stopped. Gaseous acetylene is admitted to the reactor and the pressure maintained throughout the polymerization at about the selected value such as about 1 bar absolute.

Polyacetylene is immediately formed either at the gas-liquid interface or more deeply in the suspension depending on the concentration of catalyst in the medium and the pressure. The polyacetylene can be obtained in the form of a film, a gel, or a powder.

The polymer can be directly formed on any solid surface such as metal, glass, or porcelain surfaces. The polymer can be directly synthesized on carbon fibers that have been previously impregnated with the catalytic suspension described above. After polymerization of the acetylene, the carbon fibers are immersed in the polyacetylene formed. The carbon fibers impart to the polymer mechanical and electrical properties inasmuch as the carbon fibers combine solidity with an interesting level of conductivity. ($2 \times 10^{-3} \Omega^{-1}$ cm).

The catalytic residues which are much less important than in the case of soluble catalysts, can be eliminated by washing with the aid of vapors of the solvent of the reaction.

The polyacetylene is finally dried.

The polyacetylene produced by the process of the present invention can be doped by the classical processes for doping polyacetylene such as treatment with iodine vapor under an inert atmosphere.

The examples that follow illustrate the invention without limiting it.

EXAMPLE 1 (comparison example)

An argon atmosphere was established in the reactor. Toluene from which gas has been previously removed and which has been dried over sodium was then introduced into the reactor.

Thereafter, butyl titanate was injected into the reactor to provide a concentration of 250 mmol/liter of titanate in the toluene.

Triethyl aluminum was then admitted into the reactor to provide a concentration of 1090 mmol/liter of $Et_3Al$ in the toluene solution. The Al/Ti ratio was 4.4. The reactor was drawn under vacuum and, without stirring, the toluene was cooled to a temperature of $-78°$ C. Purified gaseous acetylene at a pressure of 1 bar absolute was then introduced into the reactor. A polyacetylene film immediately formed at the surface of the catalytic solution.

Ten minutes later, the acetylene that has not reacted was evacuated and the film was washed by successive internal distillations with the aid of vapors of the solvent of the reaction.

EXAMPLE 2 (comparison)

The process was carried out as described in Example 1, but 15% by weight of polystyrene was incorporated into the toluene. A film of better mechanical quality is obtained, but the amount of titanate remained high. The polystyrene used in the example had a number average molecular weight (Mw) of 200.000.

EXAMPLE 3

In this example, a solid catalyst resulting from grinding magnesium chloride impregnated with titanium tetrachloride was used. The titanium in the catalytic solid was 1.8% by weight, the average particles size is 79 microns and the specific area in the order of 0.6 m²/g.

In this example the toluene solution contained 5% by weight polystyrene.

The amount of catalyst introduced into the toluene was 0.95 mmol titanium per liter of the solution of polystyrene in toluene.

As co-catalyst, 5 mml/liter of triethyl aluminum was added to the reaction medium.

After introduction and polymerization of acetylene, a gel was obtained.

EXAMPLE 4

The method was the same as that used in Example 3 except that 10% by weight polystyrene was added to the toluene, the titanium concentration was 1.04 mmol/liter and triethyl aluminum was 57 mmol/liter. A gel was obtained.

EXAMPLE 5

The method was the same as that used in Example 4, except that the titanium concentration was 3.8 mmol/liter and the molar ratio Al/Ti was maintained the same. A film was obtained.

EXAMPLE 6

The method was the same as that used in Example 4, expect that 15% by weight polystyrene was added to the toluene, the titanium concentration was 0.96 mmol/liter and the triethyl aluninum was 52 mmol/liter. A gel was produced.

EXAMPLE 7

The method was the same as that used in Example 6, except the amount of titanium was increased to 3.4 mmol/liter and the triethyl aluminum concentration was 255 mmol/liter. A film was obtained.

EXAMPLE 8

The method was the same as that used in Example 7 except the titanium concentration was 0.1 mmol/liter, and the triethyl aluminum concentration was 6 mmol/liter. A powder was obtained.

EXAMPLE 9

Carbon fibers were added to the catalytic suspension of Example 5. There was obtained a structure in which the carbon fibers are incorporated into a polystyrene/polyacetylene polymeric matrix.

Table 1 summarizes the results of the above tests.

The electrical and mechanical properties of the polyacetylene obtained according to the invention and according to the SHIRAKAWA method were examined and compared.

The conductivity values of the doped samples were measured in an inert atmosphere by means of a KEITHLEY 614 electrometer equipped with a source of stabilized current ENERTEC-SCHLUMBERGER 6267. The conductivity was measured by the classical four points method.

It was observed that the presence of polystyrene does not affect the electrical properties and that the same conductivity values were reached on the polyacetylene sample containing polystyrene as well as the sample which did not contain polystyrene.

The measurements of tensile strength were made under an inert atmosphere at room temperature with the aid of an INSTRON apparatus.

It is observed that the presence of polystyrene has a beneficial effect on the mechanical properties. The value of the tensile strength is increased at least by a factor of about 2 in relation to pure polyacetylene.

When carbon fibers are incorporated in the polyacetylene/polystyrene matrix tensile strength measured is that of carbon fibers, and thus increased by a factor of about 120 in relation to pure polyacetylene.

TABLE 1

| Ex | Catalyst and Cocatalyst | Titanium mmol/l | Aluminum mmol/l | Al Ti Molar | Polymeric Thickener % by Weight | Temperature °C. | Viscosity Polymerzation Medium - (20° C.) Centipoise | Product | Dopant | Conductivity $\Lambda^{-1}$ cm$^{-1}$ | Breaking Stress Pa × 10$^6$ | Deposit on solid surface |
|---|---|---|---|---|---|---|---|---|---|---|---|---|
| 1 | Ti(OC$_4$H$_9$)$_4$ | 250 | 1090 | 4,4 | 0 | −78 | 0,6 | film | Iodine | 800 | 25.5 | — |
| 2 | Al(C$_2$H$_5$)$_3$ | 250 | 1090 | 4,4 | 15 | −78 | 93 | film | Iodine | 800 | 54.9 | — |
| 3 | TiCl$_4$/MgCl$_2$ | 0.95 | 51 | 54 | 5 | −78 | 10 | gel | Iodine | 750 | 47.1 | — |
| 4 | + | 1.04 | 57 | 55 | 10 | −78 | 32 | gel | Iodine | 750 | 62.8 | — |
| 5 | Al(C$_2$H$_5$)$_3$ | 3.8 | 220 | 58 | 10 | −78 | 32 | film | Iodine | 800 | 59.8 | — |
| 6 | | 0.96 | 52 | 54 | 15 | −78 | 93 | gel | Iodine | 700 | 72.6 | — |
| 7 | | 3.4 | 255 | 75 | 15 | −78 | 93 | film | Iodine | 850 | 78.5 | — |
| 8 | | 0.10 | 6 | 60 | 10 | −78 | 32 | powder | Iodine | 800 | — | — |
| 9 | | 3.8 | 220 | 58 | 10 | −78 | 32 | film | Iodine | 750 | 3000 | Carbon Fiber |

What is claimed:

1. A process for the preparation of a polyacetylene in the form of a film or gel, by the polymerization of acetylene and gaseous derivatives thereof comprising contacting at least one member selected from acetylene and gaseous derivatives thereof with a Ziegler catalyst comprising an organic aluminum compound and at least one supported transition metal compound selected from the group consisting of compounds of Ti, V, Zr and Cr, said catalyst suspended in a polymerization medium having a viscosity between about 10 and 400 centipoises at room temperature and wherein said polymerization is effected without stirring said medium.

2. A process of claim 1, wherein the viscosity of the polymerization medium is between about 30 and 100 centipoises at room temperature.

3. A process of claim 1, wherein the polymerization medium comprises a thickener in an organic solvent.

4. A process of claim 3, wherein the thickener is a polymeric composition.

5. A process of claim 3, wherein the thickener comprises at least one polymeric composition selected from polystyrene and polyoxyethylene.

6. A process of claim 3, wherein the thickener comprises from about 5 to 20% by weight of the polymerization medium of polystyrene.

7. A process of claim 3, wherein the thickener comprises from about 10 to 15% by weight of the polymerization medium of polystyrene.

8. A process of claim 6, wherein the organic solvent is toluene.

9. A process of claim 7, wherein the organic solvent is toluene.

10. A process of claim 3, wherein the organic aluminum compound is a trialkyl aluminum compound wherein the alkyl radicals contain from 1 to 8 carbon atoms.

11. A process of claim 10, wherein the thickener comprises at least one polymer composition selected from polystyrene and polyoxyethylene.

12. A process of claim 11, wherein the thickener comprises from about 5 to 20% by weight of the polymerization medium of polystyrene.

13. A process of claim 12, wherein the organic solvent is toluene.

14. A process of claim 3, wherein the transition metal compound comprises at least one compound selected from the group consisting of an alkyl titanate and titanium halides.

15. A process of claim 10, wherein the transition metal compound comprises at least one compound selected from the group consisting of an alkyl titanate and titanium halides.

16. A process of claim 15, wherein the molar ratio of Al/Ti is from about 10 to 400.

17. A process of claim 3, wherein the transition metal compound is present at a concentration of from about 0.1 to above 3 m mol per liter.

18. A process of claim 10, wherein the transition metal compound is present at a concentration of from about 0.1 to above 3 m mol per liter.

19. A process of claim 12, wherein the transition metal compound is present at a concentration of from about 0.1 to above 3 m mol per liter.

20. A process of claim 14, wherein the transition metal compound is present at a concentration of from about 0.1 to above 3 m mol per liter.

21. A process of claim 17, wherein the concentration of the transition metal compound is above about 3 m mol per liter.

22. A process of claim 18, wherein the concentration of the transition metal compound is above about 3 m mol per liter.

23. A process of claim 19, wherein the concentration of the transition metal compound is above about 3 m mol per liter.

24. A process of claim 20, wherein the concentration of the transition metal compound is above about 3 m mol per liter.

25. A process of claim 17, wherein the concentration of the transition metal compound is from about 0.1 to 3 m mol per liter.

26. A process of claim 18, wherein the concentration of the transition metal compound is from about 0.1 to 3 m mol per liter.

27. A process of claim 19, wherein the concentration of the transition metal compound is from about 0.1 to 3 m mol per liter.

28. A process of claim 20, wherein the concentration of the transition metal compound is from about 0.1 to 3 m mol per liter.

* * * * *